United States Patent [19]
Kuramoto et al.

[11] Patent No.: US 6,262,829 B1
[45] Date of Patent: Jul. 17, 2001

(54) METHOD OF DIGITAL GRAYSCALE CONTROL USING MODULATION OF A SLOW-ACTING LIGHT SOURCE

(75) Inventors: Akinobu Kuramoto, Pleasanton; Rene P. Helbing, Palo Alto, both of CA (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/364,618

(22) Filed: Jul. 29, 1999

(51) Int. Cl.$^7$ ................................................. G02B 26/00
(52) U.S. Cl. ..................... 359/237; 359/315; 359/566; 359/888
(58) Field of Search ................................ 359/315, 275, 359/265, 320, 566–569, 888

(56) References Cited

U.S. PATENT DOCUMENTS

| 4,813,771 | 3/1989 | Handschy et al. ............ 350/350 |
| 4,954,789 | 9/1990 | Sampsell ...................... 330/4.3 |
| 5,748,164 | 5/1998 | Handschy et al. ............ 345/89 |

FOREIGN PATENT DOCUMENTS

0905674 A1 * 3/1999 (EP).

* cited by examiner

Primary Examiner—Georgia Epps
Assistant Examiner—Tim Thompson (57) ABSTRACT

A method of digital grayscale control using light source modulation. First, a light valve, grayscale data, and a light source are provided. The light valve includes a spatial light modulator with at least one pixel. The grayscale data indicates desired grayscale level for the pixel during a frame period. The light source is configured to illuminate the pixel, to generate light with increasing intensity for a rise-time after electric power to the light source is substantially increased, and to generate light with decreasing intensity for a decay-time after electric power to the light source is substantially reduced. The light source may be an arc-lamp. The rise-time and the decay-time taken together may constitute a majority of the frame period. During the frame period, the electric power to the light source is substantially increased and is substantially decreased. Substantially decreasing the electric power to the light source may include turning off the electric power. The frame period is divided into at least four time slices with independent durations so that at least one of the at least four time slices occurs completely during the decay time. This may include selecting the at least four independent durations so that a product of each of the at least four independent durations and an average intensity of the light generated by the light source over each of the at least four time slices, respectively, has a binary weighted value, respectively. The pixel is independently set to one of an 0 state and an 1 state during each of the at least four time slices of the frame period based on the grayscale data.

19 Claims, 5 Drawing Sheets

METHOD OF DIGITAL GRAYSCALE CONTROL USING MODULATION OF A SLOW-ACTING LIGHT SOURCE

FIELD OF THE INVENTION

The invention relates to methods for digital grayscale control in light valves such as those used in color video displays and in particular relates to methods of illuminating the light valve to provide improved grayscale control.

BACKGROUND OF THE INVENTION

A need exists for various types of video and graphics display devices with improved performance and lower cost. For example, a need exists for miniature video and graphics display devices that are small enough to be integrated into a helmet or a pair of glasses so that they can be worn by the user. Such wearable display devices would replace or supplement the conventional displays of computers and other devices. A need also exists for a replacement for the conventional cathode-ray tube used in many display devices including computer monitors, conventional and high-definition television receivers and large-screen displays. Both of these needs can be satisfied by display devices that incorporate a light valve that uses as its light control element a spatial light modulator. Spatial light modulators are typically based on liquid crystal material as described in U.S. Pat. No. 4,813,771, entitled "Electro-Optic Switching devices using Ferroelectric Liquid Crystals," but may also be based on arrays of moveable mirrors as described in U.S. Pat. No. 4,954,789, entitled "Spatial Light Modulator."

Liquid crystal-based spatial light modulators are available in either a transmissive form or in a reflective form. The transmissive spatial light modulator is composed of a layer of a liquid crystal material sandwiched between two transparent electrodes. The liquid crystal material can be either ferroelectric or nematic type. One of the electrodes is segmented into an array of pixel electrodes to define the picture elements (pixels) of the transmissive spatial light modulator. The direction of an electric field applied between each pixel electrode and the other electrode determines whether or not the corresponding pixel of the transmissive spatial light modulator rotates the direction of polarization of light falling on the pixel. The transmissive spatial light modulator is constructed as a half-wave plate and rotates the direction of polarization through 90° so that the polarized light transmitted by the pixels of the spatial light modulator either passes through a polarization analyzer or is absorbed by the polarization analyzer, depending on the direction of the electric field applied to each pixel.

Reflective liquid crystal-based spatial light modulators are similar in construction to transmissive liquid crystal-based spatial light modulators, but use reflective pixel electrodes and have the advantage that they do not require a transparent substrate. Accordingly, reflective spatial light modulators can be built on a silicon substrate that also accommodates the drive circuits that derive the drive signals for the pixel electrodes from the input video signal. A reflective light valve has the advantage that its pixel electrode drive circuits do not partially include the light modulated by the pixel. This enables a reflective light valve to have a greater light throughput than a similar-sized transmissive light valve and allows larger and more sophisticated drive circuits to be incorporated.

As with the transmissive spatial light modulators, the direction of an electric field (in this case between the transparent electrode and the reflective electrode) determined whether or not the corresponding pixel of the reflective spatial light modulator rotates through 90° the direction of polarization of the light falling on (and reflected by) the pixel. Thus, the polarized light reflected by the pixels of the reflective spatial light modulator either passes through a polarization analyzer or is absorbed by the polarization analyzer, depending on the direction of the electric field applied to each pixel.

The resulting optical characteristics of each pixel of both the transmissive and reflective liquid crystal-based spatial light modulators are binary: each pixel either transmits light (its 1 state) or absorbs light (its 0 state), and therefore appears light or dark, depending on the direction of the electric field.

Spatial light modulators based on arrays of moveable mirrors are typically arranged so that the mirror of each pixel has a resting position and a powered position. The resting position is the position the mirror takes when its control mechanism is unpowered. The powered position is the position the mirror takes when power is applied to its control system. When the mirror is in one of the resting position or powered position, it is configured so that light illuminating the mirror is reflected towards an output. In the other position, the mirror is configured so that light illuminating the mirror is reflected away from the output. The resulting optical characteristics of each pixel of moving mirror-based spatial light modulators are binary: each pixel either reflects light toward the output (its 1 state) or away from the output (its 0 state), and therefore appears light or dark, depending on the power condition to the control mechanism.

To produce the grayscale required for conventional display devices with either liquid crystal-based or moving mirror-bases spatial light modulators, several techniques are known in the art. These including time domain grayscale control, light source intensity grayscale control, and a hybrid of time domain and light source intensity domain grayscale control.

With time domain grayscale control, the apparent brightness of each pixel is varied by temporally modulating the 0 state and 1 state of each pixel. The level of gray is controlled by defining a basic time period that will be called the frame period of the spatial light modulator and controlling the duration of the 1 state relative to the duration of the 0 state during the frame period. This determines the apparent brightness, or grayscale, of the pixel.

Figure 1:
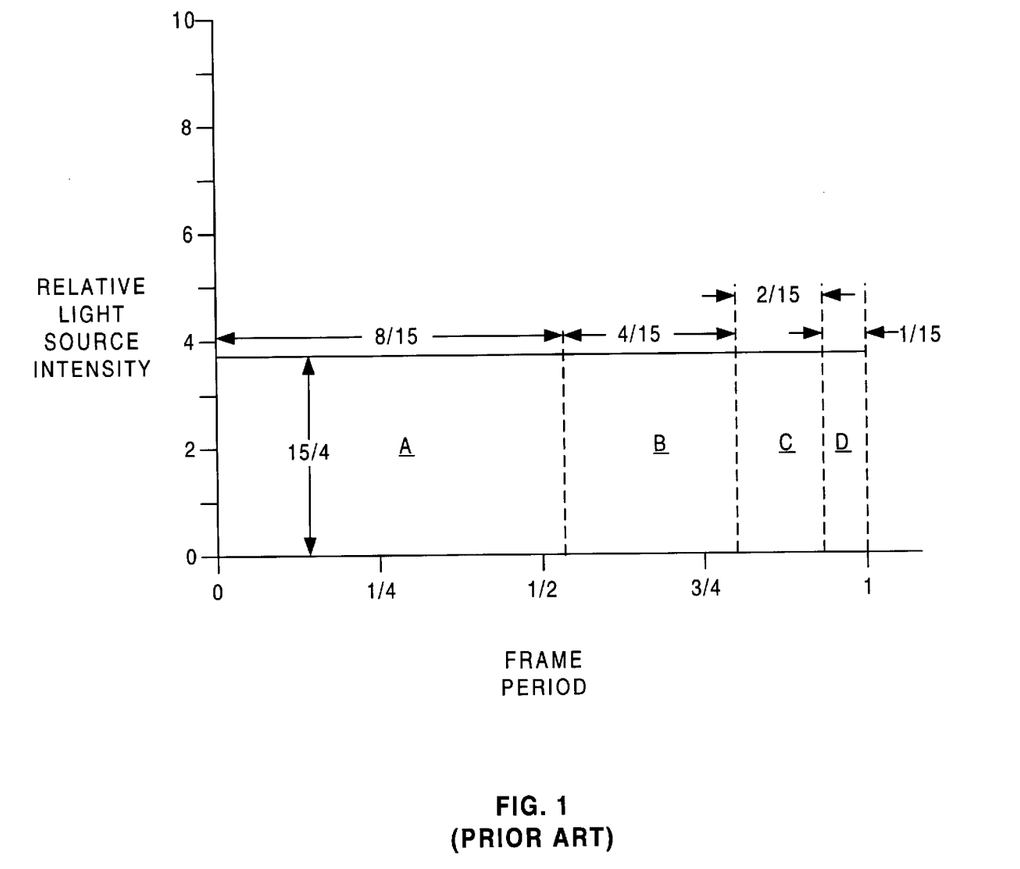
FIG. 1 illustrates prior art time domain grayscale control.

With time domain control, the frame period for a given pixel is typically divided into time elements associated with a binary weighted value. FIG. 1 depicts time domain control for a pixel given 4-bit grayscale data, corresponding to 16 levels of gray. The figure is a graph with relative light intensity shown on the Y-axis, and time in terms of a time period shown on the X-axis. The light source is depicted as having a constant relative intensity of $15/4$ths. The frame period is divided into four time slices A, B, C and D, the relative duration of each period corresponding to the relative value of each of the four digits in a four-digit binary number, such as 1111. Thus, the relative durations correspond to the relative values of the binary numbers 1000, 0100, 0010, and 0001 or their decimal equivalents 8, 4, 2, and 1. Since the sum of these numbers is 15, the four time slices A–D have durations of $8/15$, $4/15$, $2/15$, and $1/15$ of a frame period, respectively.

By selectively setting the pixel to either its 1 state or its 0 state during each of the four time slices, any of the 16 levels of gray can be selected as is shown in the following

TABLE 1

| Decimal Grayscale Level | Binary Grayscale Level | Pixel State First Period | Pixel State Second Period | Pixel State Third Period | Pixel State Fourth Period |
|---|---|---|---|---|---|
| 0 (black) | 0000 | 0 | 0 | 0 | 0 |
| 1 | 0001 | 0 | 0 | 0 | 1 |
| 2 | 0010 | 0 | 0 | 1 | 0 |
| 3 | 0011 | 0 | 0 | 1 | 1 |
| 4 | 0100 | 0 | 1 | 0 | 0 |
| 5 | 0101 | 0 | 1 | 0 | 1 |
| 6 | 0110 | 0 | 1 | 1 | 0 |
| 7 | 0111 | 0 | 1 | 1 | 1 |
| 8 | 1000 | 1 | 0 | 0 | 0 |
| 9 | 1001 | 1 | 0 | 0 | 1 |
| 10 | 1010 | 1 | 0 | 1 | 0 |
| 11 | 1011 | 1 | 0 | 1 | 1 |
| 12 | 1100 | 1 | 1 | 0 | 0 |
| 13 | 1101 | 1 | 1 | 0 | 1 |
| 14 | 1110 | 1 | 1 | 1 | 0 |
| 15 (white) | 1111 | 1 | 1 | 1 | 1 |

In practice, the frame period duration may be about 1/60 second (approximately 16,640 μsec) which corresponds to a refresh rate of 60 Hz typically found in computer displays. In addition, grayscale is more typically defined by 8-bits of data than 4-bits of data allowing 256 levels of gray to be defined instead of 16 levels of gray. Using the time domain grayscale control as just described, the frame period would be broken in eight time slices with durations of 8320 μsec, 2080 μsec, 1040 μsec, 520 μsec, 260 μsec, 130 μsec, and 65 μsec, respectively. By selectively setting the pixel to either its 1 state or its 0 state during each of the eight time slices, any of the 256 levels of gray can be selected.

One disadvantage of this type of time domain grayscale control, however, is that the switching speed of the pixel in many of today's light valves is not fast enough to provide a well-defined 0 state or 1 state in less than about 60 μsec. This means that it is difficult to provide more than 256 levels of gray without lengthening the frame period. It also means that 256 levels of gray is difficult to provide when the frame period becomes shorter than about 1/60 of a second as when the refresh rate is increased.

Another disadvantage of this type of domain grayscale control is the minimal time allowed for grayscale data loading during the shortest duration time slices. The magnitude of this problem is not clear from the above description of the operation of a single pixel. In fact, each spatial light modulator usually includes an vast number of individual pixels. For example, a spatial light modulator with a 1,200×1,600 pixel array includes 1,920,000 individual pixels. Each of these pixels has individual grayscale data that must be loaded before each change of pixel state. Loading the vast quantity of grayscale data for the next pixel state in the time required for the shortest duration time slices is often very difficult and may require higher cost electronic components and designs, particularly when more than 8 bits of grayscale control are desired.

Figure 2:
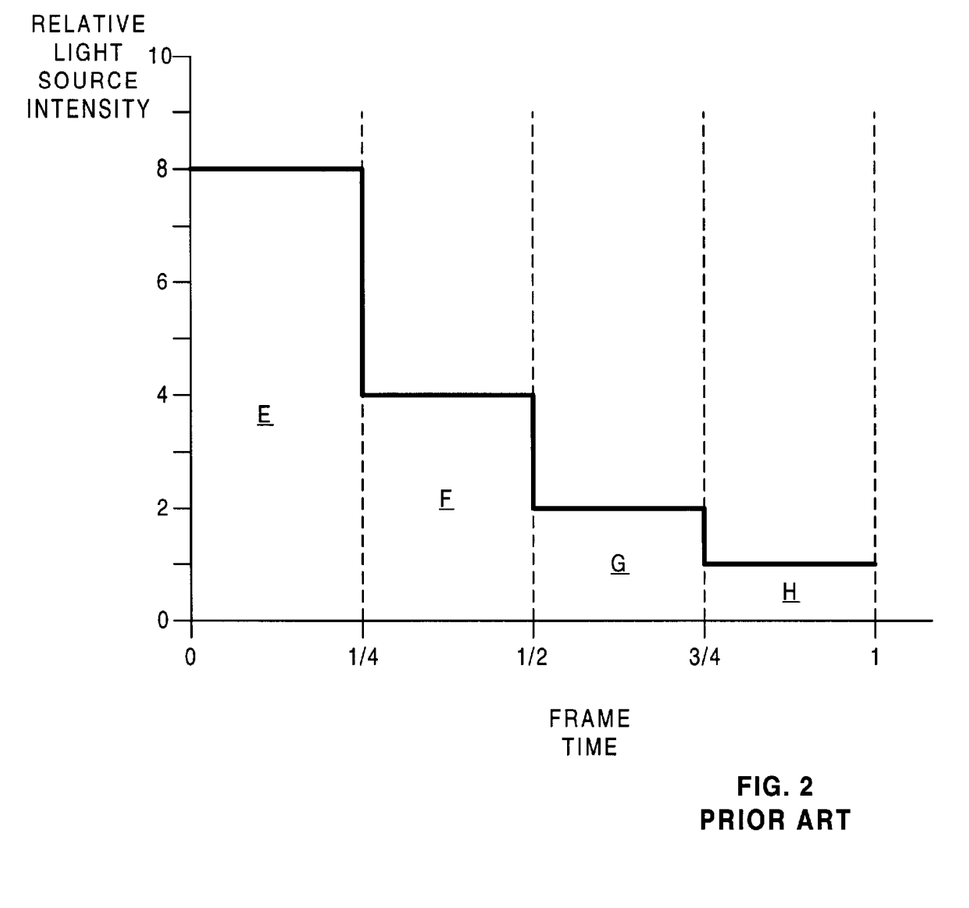
FIG. 2 illustrates prior art light intensity domain grayscale control.

A second type of prior art grayscale control is light source intensity domain grayscale control. With light source intensity domain grayscale control the frame period for a given pixel is typically divided into equal time elements each associated with a light intensity with a binary weighted value as depicted in FIG. 2. This figure depicts light source intensity domain control for a pixel given 4-bit grayscale data, corresponding to 16 levels of gray with axises that correspond to those found in FIG. 1. The frame period is divided into four time slices E, F, G and H, each with a duration equal to ¼ frame period. The relative light intensity during each of the four time slices E–H corresponds to the relative value of each of the four digits in a four-digit binary number. Thus, the relative light source intensity correspond to the relative values of the binary numbers 1000, 0100, 0010, and 0001 or their decimal equivalents 8, 4, 2, and 1 as shown.

Light source intensity grayscale control has traditionally been done using fast-acting light sources, and the pixels have been switched to a 0 state during the light source intensity rise-time and decay-time to prevent the transient intensity light generated by the light source during the rise-time and decay-time from reaching the light output and affecting the grayscale level. Rise-time is the time between setting the input of a light source (typically current or voltage control) to the desired higher level and the light source intensity reaching that higher level as a steady state. Similarly, decay-time is the time between setting the input of a light source to the desired lower level and the light source intensity reaching that lower level as a steady state. Certain fast-acting light sources such as LEDs and lasers lend themselves to light source intensity grayscale control because they are relatively easy to modulate between the required intensity levels using current controls know in the art. The also have very short rise-times and decay-times relative to the duration of the frame period.

As previously described, by selectively setting the pixel to either its 1 state or its 0 state during each of the four time slices, any of the 16 levels of gray can be selected as is shown in Table 1. In practice, to achieve 256 levels of gray in a frame period having a duration of 1/60 second (approximately 16,640 μsec.), with light intensity domain grayscale control, the frame period would be divided into eight portions, each with a duration of 2080 μsec.

One advantage of light source intensity grayscale control over time domain grayscale control is that the shortest time slice of the frame period is substantially longer in light intensity grayscale control than in time domain grayscale control. For example, the shortest time slice for the light intensity grayscale control shown in FIG. 1 is ¼ of a frame period while the shortest time slice for the time domain grayscale control shown in FIG. 2 is 1/15 of a frame period. Thus the shortest time slice in light intensity grayscale control has a duration nearly four times that of the shortest time slice in time domain grayscale control. The ratio of the shortest period for time domain grayscale control to the shortest period for light intensity domain grayscale control becomes even larger as more bits of grayscale are added. This effect is shown in Table 2, below.

TABLE 2

| No. of Grayscale Bits | No. of Levels of Gray | Shortest Period - Time Domain (% Frame Period) | Shortest Period - Light Intensity Domain (% Frame Period) | Ratio of Shortest Period (Time Domain: Light Intensity) |
|---|---|---|---|---|
| 4 | 16 | 6.67 | 25.0 | 1:3.82 |
| 8 | 256 | 0.392 | 12.5 | 1:31.9 |
| 16 | 65,536 | 0.00153 | 6.25 | 1:4,085 |

The substantial lengthening of the duration of the shortest time slice allows more time for the pixels to actually switch from one state to another and for the grayscale data to be loaded for the next pixel state. Consequently, light source intensity grayscale control allow more grayscale bits can be used, shorter frame periods to be used, and less expensive electronic components and designs can be used than would be possible with time domain grayscale control.

Light source intensity grayscale control, however, has not traditionally been used in some display applications that require slow-acting, high intensity light sources, such as arc-lamps. Rather than quickly achieving the long steady-state intensity levels used by light source intensity grayscale control, these slow-acting, high intensity light sources have rise times and decay times that are a substantial fraction of a frame period or may even exceed the duration of a frame period.

A third type of prior art grayscale control is a hybrid of time domain grayscale control and light source intensity domain grayscale control. Hybrid grayscale control is typically used when the light source intensity is controllable, but where the maximum intensity is reached before the largest of the binary weighted values can be achieved. With hybrid grayscale control the frame period for a given pixel is typically divided into several equal time elements and several time elements that have durations with binary weighted values. Each of the time elements of equal duration are associated with a light intensity with a binary weighted value as with the previously described light source intensity grayscale control.

Figure 3:
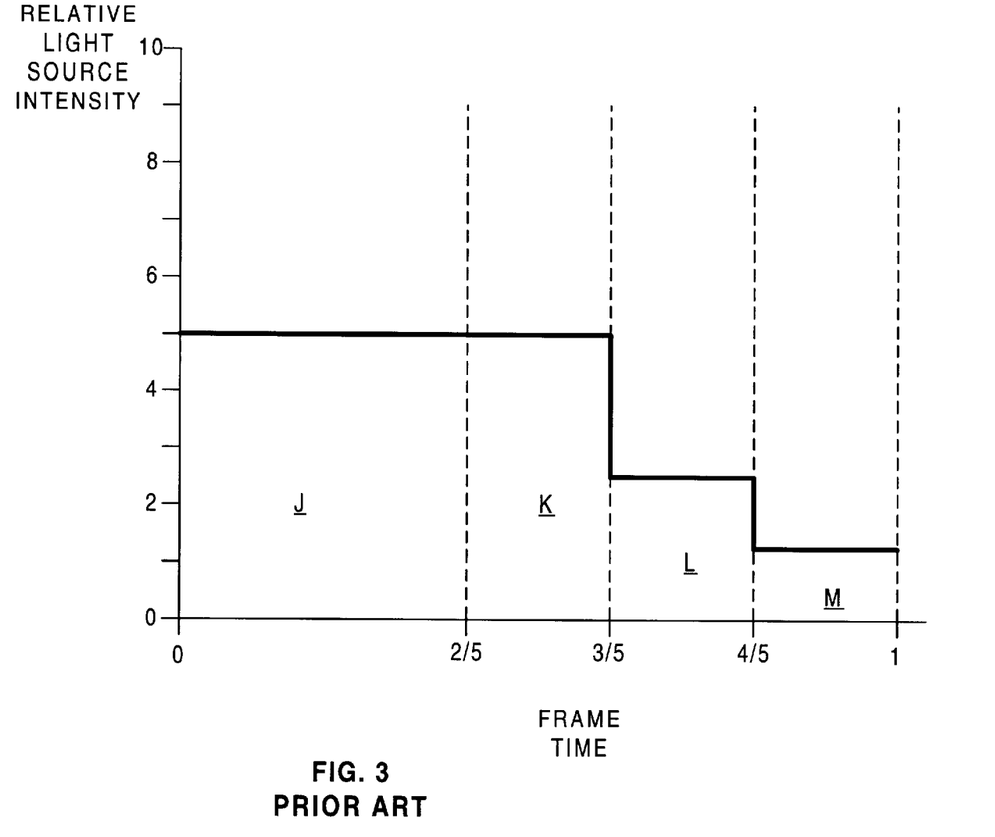
FIG. 3 illustrates a prior art hybrid of light intensity and time domain grayscale control.

FIG. 3 is a graph depicting hybrid grayscale control for a pixel given 4-bit grayscale data, corresponding to 16 levels of gray. The axes of the graph correspond to the axises in FIGS. 1–2. For purposes of this figure, it is presumed that the light source has a maximum relative intensity level of 5. The frame period is divided into four time slices J, K, L, and M, with the last three time slices K–M each having durations of ⅕ frame period. In contrast, the first period J has a duration twice that of the other three time slices K–M. During the first two time slices J–K the relative light intensity is at the presumed maximum level of 5 with each following period having a value of half the preceding period. Thus, the intensity of the light source during the third period L is 5/2 and the intensity of the light source during the third period M is 5/4.

Like light source intensity grayscale control, hybrid grayscale control has traditionally been done using fast-acting light sources, and the pixels have been switched to a 0 state during the light source intensity rise-time and decay-time to prevent the transient intensity light generated by the light source during the rise-time and decay-time from reaching the light output and affecting the grayscale level. The same light sources that lend themselves to light source intensity grayscale control are typically used in hybrid grayscale control as well for the same reasons. By selectively setting the pixel to either its 1 state or its 0 state during each of the four time slices, any of the 16 levels of gray can be selected as is shown in Table 1.

Hybrid grayscale control offers the advantage of lengthening the duration of the shortest time slices during the frame period, but to a lesser extent than can be achieved with light source intensity modulation alone. It also offers a grayscale control solution that allows the use light sources with limited ranges of usable intensity modulation.

Like light source intensity grayscale control, hybrid grayscale control has not traditionally been used in some display applications that require slow-acting, high intensity light sources, such as arc-lamps. Rather than quickly achieving the long steady-state intensity levels used by light source intensity grayscale control, these slow-acting, high intensity light sources have rise times and decay times that are a substantial fraction of a frame period or may even exceed the duration of a frame period.

Consequently, what is needed a method of grayscale control that provides the advantages of lengthening of the shortest time slices in a frame period while allowing the use of slow-acting light sources.

SUMMARY OF THE INVENTION

The invention provides a method of digital grayscale control using light source modulation. The method according to the invention begins by providing light valve, grayscale data, and a light source. The light valve includes a light input, a light output, and a spatial light modulator with at least one pixel. The grayscale data indicates desired grayscale level for the pixel during a frame period. The frame period may have a duration of less than 0.05 seconds. The light source is configured to illuminate the pixel, to generate light with increasing intensity for a rise-time after electric power to the light source is substantially increased, and to generate light with decreasing intensity for a decay-time after electric power to the light source is substantially reduced. The light source may be an arc-lamp. The rise-time and the decay-time taken together may constitute a majority of the frame period, more than 75% of the frame period, or more than 95% of the frame period. The decay time taken alone may constitute more than 25% of the frame period or more than 90% of the frame period.

During the frame period, the electric power to the light source is substantially increased and is substantially decreased. Substantially decreasing the electric power to the light source may include tuning off the electric power. Substantially increasing the electric power to the light source may occur at the beginning of the frame period, in which case substantially reducing the electric power to the light source occurs after a one or more of the at least four time slices is completed. Alternatively, substantially reducing the electric power to the light source may occur at the beginning of the frame period, in which case substantially increasing the electric power to the light source occurs after one or more of the at least four time slices is completed.

The method according to the invention also includes dividing the frame period into at least four time slices with independent durations so that at least one of the at least four time slices occurs completely during the decay time. This may include selecting the at least four independent durations so that a product of each of the at least four independent durations and an average intensity of the light generated by the light source over each of the at least four time slices, respectively, has a binary weighted value, respectively. Alternatively, a mathematical progression $2^{n-1}, 2^{n-2} \ldots 2^1, 2^0$ may substantially describes a proportional relationship between a product of each of the at least four independent durations and an average intensity of the light generated by the light source over each of the at least four time slices, respectively, where n is a total number of the at least four portions. The value of n may be 8 or 16, and the shortest of the at least four independent durations may be longer than 200 μsec or longer than 300 μsec.

Additionally, the pixel is independently set to one of an 0 state and an 1 state during each of the at least four time slices of the frame period based on the grayscale data.

DETAILED DESCRIPTION OF THE INVENTION

The invention is based, in part, on the concept that the grayscale value for a given light valve pixel is actually a product of the total duration of time slices during which the pixel is in its 1 state during the frame period and the average light source intensity during those time slices. The method of grayscale control according to the invention takes advantage of the rise-time and decay-time of a slow-acting light source to reduce the need for frame period time slices having very short durations.

The method according to the invention begins by providing a light valve, grayscale data, and a light source. Light valves are known in the art and include a light input, at least one spatial light modulator, and a light output. The spatial light modulator may be of any type known in the art including, but not limited to, liquid crystal-based and micro-mirror-based. If liquid crystal-based, the spatial light modulator may be either of the transmissive or reflective variety. The spatial light modulator ideally includes an array of individually controllable pixels, but must include at least one pixel.

Each pixel included on a spatial light modulator must be individually switchable between a 0 state in which light illuminating the pixel from the light input is prevented from reaching the light output, and a 1 state in which light illuminating the pixel from the light input reaches the light output. Circuitry for individually switching each of the pixels in the array may also be included with the light valve and may either be integrated with or separate from the spatial light modulator. The number of pixels in the array will typically define the maximum display resolution of a display device in which the light valve is located, although light valves may themselves be arrayed to increase the resolution beyond a level which can be defined by a single array of pixels on the spatial light modulator. For purposes of clarifying the description of the method according to the invention, the operation of only a single pixel will be described below.

Grayscale data is data that defines a desired relative brightness of a pixel during a particular frame period. Grayscale data may be analog or digital and defines the desired relative brightness at some point between a maximum brightness (white) and no brightness (black). For purposes of this description, grayscale data must be able to define at least 16 levels of gray including black and white. When the grayscale data is in a digital form, this means it must include at least four bits of binary data. It is preferred, however, that the grayscale data be able to define either 256 levels of gray or 65,536 levels of gray. These correspond to 8 bits and 16 bits of binary grayscale data, respectively.

The frame period is the period during which a spatial light modulator is configured for the purpose of presenting a single "frame" of a moving image at the light output. For purposes of this description, presenting a single frame of a moving image may include either an actual change in the image to be presented or a "refresh" of the previously displayed image. Thus, the duration of the frame period is driven by either the number of images to be displayed per second or the refresh rate of the display device.

Aside from the actual number of images and the refresh rate, another factor that can affect the duration of the frame period is the configuration of the light valve. For example, a light valve configured to present color images by displaying sequential red, green, and blue images would presumably have a frame period for each color that would have a duration approximately one third the duration otherwise required.

Further, some spatial light modulators, such as ferroelectric liquid crystal-based spatial light modulators, are typically run in a DC balanced mode. Operating in a DC balanced mode means the spatial light modulator is configured during half of an operating cycle, called the "illumination period," to present a "positive" image that can reach the light output. During the remainder of the operating cycle, called the "balance period," the DC balanced spatial light modulator is configured to present a balancing "reverse" image which is prevented from reaching the light output. For purposes of this description, the frame period includes only the illumination period in a light valve that includes a spatial light modulator operating in a DC balanced mode.

The duration of a frame period should be shorter than 0.05 second corresponding to at least 20 images per second. When fewer than 20 images per second are used, the image presented at the light output may include an undesirable strobe effect.

The light source provided is configured to illuminate the pixel through the light input of the light valve. The light source generates light with increasing intensity for a rise-time after electric power to the light source is substantially increased to a high level until a steady state intensity level for that high level is reached. The light source also generates light with decreasing intensity for a decay-time after electric power to the light source is substantially reduced until a steady state intensity level is reached. The rate of change in the light intensity level during both the rise-time and the decay-time is usually greatest following the change in the electric power level and decreases as the intensity level approaches the steady state level.

For purposes of this description, the rise time may include an intensity "spike" which occurs in some light sources known in the art immediately following a substantial increase in electric power. An intensity spike is a period during which the light source rapidly increases intensity to a level exceeding the steady state intensity level for the high level of electric power followed by a rapid decrease in the intensity to a level below the steady state intensity level for the high level of electric power.

The light source provided is also slow-acting. For purposes of this description, a slow-acting light source is one that has a rise-time and a decay-time, the sum of which exceed 50% of the frame period. The light source provided is preferably an arc-lamp. Arc-lamps are known in the art, are slow-acting, generate high intensity light, and are both reliable and available.

The method of grayscale control according to the invention includes substantially increasing the electric power supplied to the light source to a higher level at one point during the frame period and substantially decreasing the electric power supplied to the light source to a lower level at a second point during the frame period. Substantially decreasing the electric power supplied to the light source may include turning off the light source. In the case of an arc-lamp, this may include reducing the power below a point where an arc can be maintained within the light source.

The order, timing, and magnitude of the substantial increase and substantial decrease may be changed to meet the requirements of the particular light valve and gray scale resolution provided. Regarding the order of occurrence, for example, the electric power to the light source may be at a low point prior to the start of a frame period and may be substantially increased at the beginning of the frame period followed by a substantial decrease in electric power to the light source at a later point during the frame period. Alternatively, the electric power to the light source may be at a high point prior to the start of the frame period and may be substantially reduced at the beginning of the frame period followed by a substantial increase in the electric power to the light source at a later point during the frame period.

The timing and/or magnitude of the substantial increase and the substantial decrease in the electric power to the light source are adjusted so that the intensity of the light generated by the light source is increasing and decreasing for more than 50% of the frame period. For example, the intensity of the light generated by the light source may be decreasing during a majority of the frame period and increasing for more than 25% of the frame period. Generally, the advantages offered by the method of grayscale control according to the invention may actually improve as the amount of steady-state time during the frame period decreases. Thus, having the intensity of the light source increasing and decreasing for more than 75% of the frame period provided good performance. Having the intensity of the light source increasing and decreasing for between 95% and 100% of the frame period, however, would provide even better performance.

The method of grayscale control according to the invention additionally includes dividing the frame period a number of time slices with independent durations so that at least one of the time slices begins and ends during the decay-time of the light source. The number of time slices into which the frame period is divided will define the total number of grayscale levels that may be selected from for the pixel to display during a frame period. The total number of grayscale levels is equal to $2^n$, where n is the total number of time slices in the frame period. In order to get at least 16 levels of gray, the minimum useful number in many display applications, there must be at least four time slices. Eight time slices will result in 256 levels of gray, and sixteen time slices will result in 65,536 levels of gray.

Each of the time slices is assigned a unique number from the progression $2^{n-1}, 2^{n-2}, \ldots 2^1, 2^0$ which will be called the binary weighted value (BWV) of that time slice. The duration of each time slice is selected so that a product of the duration and the average intensity of the light generated by the light source over that duration has a relative value proportional to the BWV for that time slice.

Figure 4:
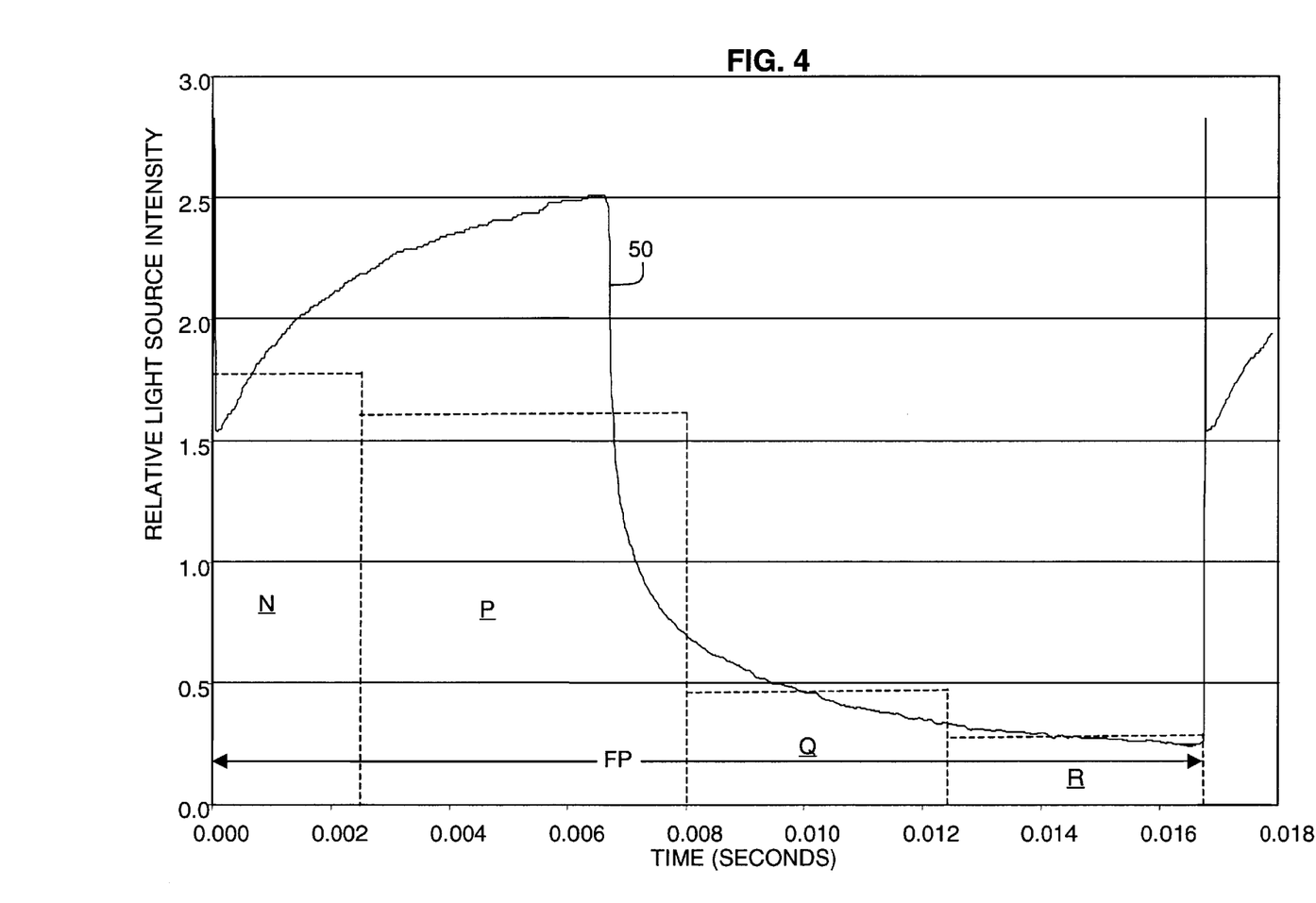
FIG. 4 illustrates 4-bit grayscale control using modulation of a slow-acting light source according to the invention.

FIG. 4 depicts a frame period FP having a duration of about 1/60 second during which the relative intensity of light 50 generated by a slow-acting light first increases and then decreases. The increasing intensity corresponds to a substantial increase in the electric power supplied to the light source at the beginning of the frame period. The decreasing intensity corresponds to a substantial decrease in the electric power to the light source at 0.0067 seconds into the frame period. The frame period has been divided into four time slices N, P, Q, and R. The BWV, duration, and average relative light intensity for each time slice is detailed in Table 3, below.

TABLE 3

|  | Time Slice N | Time Slice P | Time Slice Q | Time Slice R |
| --- | --- | --- | --- | --- |
| Chronological Sequence | 1 | 2 | 3 | 4 |
| BWV | 4 | 8 | 2 | 1 |
| Duration (Dur.) | 0.0025 | 0.0055 | 0.0045 | 0.0042 |
| Ave. Rel. Intensity (ARI) | 1.76 | 1.60 | 0.489 | 0.262 |
| Dur. × ARI | 0.0044 | 0.0088 | 0.0022 | 0.0011 |
| Rel. Ratio of Dur. × ARI ((Dur. × ARI) / 0.0011) | 4 | 8 | 2 | 1 |

The BWV have been assigned so that the lowest BWV, having a value of 1, is assigned to the time slice R having to the lowest average intensity. The remaining BWVs, 2, 4, and 8, have been assigned to the other three time slices, N, P, Q. The BWVs having a value of 4 and 8 have been assign to time slices N and P respectively to illustrate that the BWVs do not have to occur in a chronological order corresponding to the mathematical progression that defines the BWVs.

Figure 5:
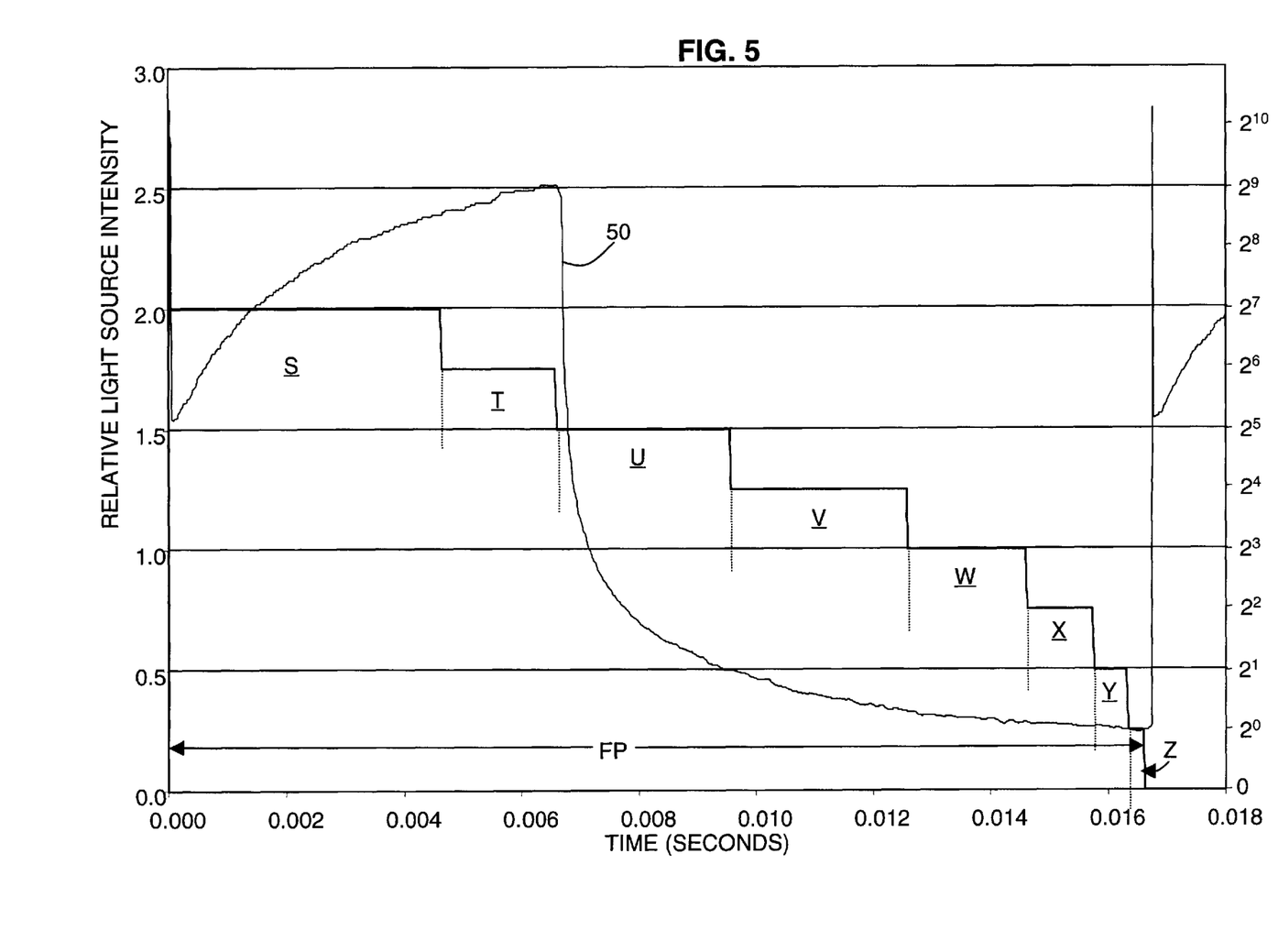
FIG. 5 illustrates 8-bit grayscale control using modulation of a slow-acting light source according to the invention.

FIG. 5 is a graph similar to that shown in FIG. 4 depicting the same increasing and decreasing relative intensity of light 50 generated by a slow acting light source over a frame period FP. The relative light source intensity is shown by the scale on the left side of the graph. In this figure, the frame period is divided into eight time slices S–Z which corresponds to eight bits of grayscale data and 256 gray levels that can be defined. The BWV of each time slice is indicated by the scale on the right side of the graph.

The timing of the substantial increase and substantial decrease in the electric power to the light source may also be coordinated with the selection of the time slices to maximize the advantages of the method according to the advantage. For example, the power to the light source may be substantially increased at the beginning of a frame period, and may be substantially reduced only after a fixed number of time slices have started and finished. In FIG. 4, for example, instead of the power being substantially reduced before time slice P has finished, as shown, the electric power supplied to light source could be left at its high level until after time slice P has finished. This would offer the additional advantage that the average relative intensity over the duration would be increased. This would allow the duration for time slice P to be shortened without changing the product of the duration and the average relative intensity over the duration. Since time slice P was the time slice with the longest duration, shortening it would allow extra time to be added to the durations of one or more of the other time slices.

Alternatively, the frame period may begin with a substantial decrease in the electric power supplied to the light source and the timing of the substantial increase can be coordinated with the finish of one of the time slices. For example, the power can be held at the low level until both the first and second time sequential time slices have completed their durations, and then can be substantially increased.

Once the frame period has been divided into time slices, the pixel can be made to display the desired level of gray indicated by the grayscale data by independently setting the pixel to either its 0 state or its 1 state during each of the time slices in much the same manner as previously described and indicated in Table 1. In the method according to the invention, however, the pixel state for each time slice would be given in order of decreasing BWV rather than in chronological order.

The method of grayscale control according to the invention offers similar advantages to those in light source intensity domain grayscale control with regards to lengthening the shortest time slices. In FIG. 4, for example, the shortest time slice, time slice N has a duration of 15 percent of the frame period. This is more than twice as long as the shortest slice that would be necessary with time domain grayscale control. Similarly, in FIG. 5, the shortest time slice is over 300 μsec instead of the 65 μsec that would be necessary with time domain grayscale control. The longer time slice durations can be taken advantage of to allow more grayscale levels in the same frame period, to shorten frame period and increase refresh rates without decreasing the number of grayscale levels. The longer time slice durations may also allow the use of less complex and less expensive electronic controls for loading grayscale data and switching the pixels in the spatial light modulator.

Although this disclosure describes illustrative embodiments of the invention in detail, it is to be understood that the invention is not limited to the precise embodiments described, and that various modifications may be practiced within the scope of the invention defined by the appended claims.

We claim:

1. A method of digital grayscale control using light source modulation, the method comprising:

providing a light valve including a spatial light modulator with at least one pixel;

providing grayscale data that indicates desired grayscale level for the pixel during a frame period;

providing a light source configured to illuminate the pixel, the light source generating light with increasing intensity for a rise-time after electric power to the light source is substantially increased and generating light with decreasing intensity for a decay-time after electric power to the light source is substantially reduced;

measuring response of the light source;

increasing substantially the electric power to the light source;

reducing substantially the electric power to the light source;

dividing the frame period into at least four time slices with independent durations, the durations being varied as a function of the measured response so that each time slice has a binary weighted value; and independently setting a pixel to one of an 0 state and an 1 state during each of the at least four time slices of the frame period based on the grayscale data.

2. The method of digital grayscale control using light source modulation according to claim 1, in which:

increasing substantially the electric power to the light source occurs at the beginning of the frame period; and reducing substantially the electric power to the light source occurs after a first occurring of the at least four time slices is completed.

3. The method of digital grayscale control using light source modulation according to claim 2, in which:

reducing substantially the electric power to the light source occurs after both the first occurring of the at least four time slices and a second of the at least four time slices are completed.

4. The method of digital grayscale control using light source modulation according to claim 1, in which:

reducing substantially the electric power to the light source occurs at the beginning of the frame period; and increasing substantially the electric power to the light source occurs after a first occurring of the at least four time slices is completed.

5. The method of digital grayscale control using light source modulation according to claim 4, in which:

increasing substantially the electric power to the light source occurs after both the first occurring of the at least four time slices and a second of the at least four time slices are completed.

6. The method of digital grayscale control using light source modulation according to claim 1, in which:

the frame period has a duration of less than 0.05 second.

7. The method of digital grayscale control using light source modulation according to claim 6, in which:

the intensity of the light generated by the light source is decreasing during a majority of the frame period.

8. The method of digital grayscale control using light source modulation according to claim 6, in which:

the intensity of the light generated by the light source is increasing and decreasing during a majority of the frame period.

9. The method of digital grayscale control using light source modulation according to claim 8, in which:

the intensity of the light source is increasing and decreasing during more than seventy-five percent of the frame period.

10. The method of digital grayscale control using light source modulation according to claim 8, in which:

the intensity of the light generated by the light source is increasing and decreasing during more than ninety-five percent of the frame period.

11. The method of digital grayscale control using light source modulation according to claim 7, in which the intensity of the light generated by the light source is increasing during more than twenty-five percent of the frame period.

12. The method of digital grayscale control using light source modulation according to claim 8, in which:

the light source provided is an arc-lamp.

13. The method of digital grayscale control using light source modulation according to claim 8, in which:

substantially reducing the electric power includes switching off the electric power.

14. A method of using a light source to perform digital grayscale control of a pixel in spatial light modulator, the method comprising:

measuring response of the light source; and configuring a frame period during which the light source provides illumination, the frame period being configured by dividing the frame period into at least four time slices, durations of the time slices being varied as a function of the measured response so that each time slice has a binary weighted value.

15. The method of claim 14, wherein the light source is slow-acting.

16. Apparatus comprising:

a spatial light modulator; and a lamp for providing illumination over at least one frame period; and means for causing lamp power to be substantially increased and decreased during each frame period, each frame period having a plurality of time slices, durations of the time slices being a function of measured response of the lamp.

17. The apparatus of claim 16, wherein the durations result in binary weighted values for the time slices.

18. The apparatus of claim 16, wherein the lamp is slow-acting.

19. The apparatus of claim 16, wherein the lamp is an arc lamp.

* * * * *